United States Patent [19]

Misra et al.

[11] Patent Number: 5,718,987
[45] Date of Patent: Feb. 17, 1998

[54] LEAD-ACID BATTERY WITH INACTIVE CELL

[75] Inventors: Sudhan Misra, North Wales; Douglas Tenney, Audubon; Franz Wagner, Lansdale, all of Pa.

[73] Assignee: C & D Charter Power Systems, Inc., Plymouth, Pa.

[21] Appl. No.: 180,085

[22] Filed: Jan. 11, 1994

[51] Int. Cl.$^6$ .............................. H01M 2/24; H01M 4/73
[52] U.S. Cl. .................... 429/160; 429/211; 429/225; 429/241; 429/245
[58] Field of Search ......................... 429/160, 161, 429/152, 225, 211, 9, 233, 241–245

[56] References Cited

U.S. PATENT DOCUMENTS

| | | | |
|---|---|---|---|
| 1,069,809 | 8/1913 | Prince | 429/211 |
| 1,126,671 | 1/1915 | Wilson | 429/211 |
| 1,947,473 | 2/1934 | Huebner | 429/211 |
| 3,253,962 | 5/1966 | Deprill et al. | 429/160 |
| 3,257,237 | 6/1966 | Jache | |
| 3,457,112 | 7/1969 | Reber | |
| 3,711,335 | 1/1973 | Daniel | 429/161 |
| 4,076,906 | 2/1978 | Jensen | |
| 4,391,036 | 7/1983 | Kishimoto et al. | |
| 5,149,605 | 9/1992 | Dougherty | 429/160 |
| 5,227,266 | 7/1993 | Shaffer et al. | 429/160 |

*Primary Examiner*—Anthony Skapars

[57] ABSTRACT

A lead-acid battery includes a compartmented case and a polarity of electrochemically lead-acid cells serially connected via respective positive and negative terminals. Each cell includes planar positive and negative plates and resides in one compartment of the case. The battery further includes an electrochemically inactive cell serially connected with the electrochemically active cells and being intermediately disposed respecting the electrochemically active cells. Plates of the inactive cell preferably have connecting lugs extending therefrom which align with corresponding connecting lugs of the positive and negative plates of the active cells. Rigid homogeneous foam separates the inactive cell plates from one another and fills the inactive cell compartment thereby providing support for the inactive cell plates.

36 Claims, 6 Drawing Sheets

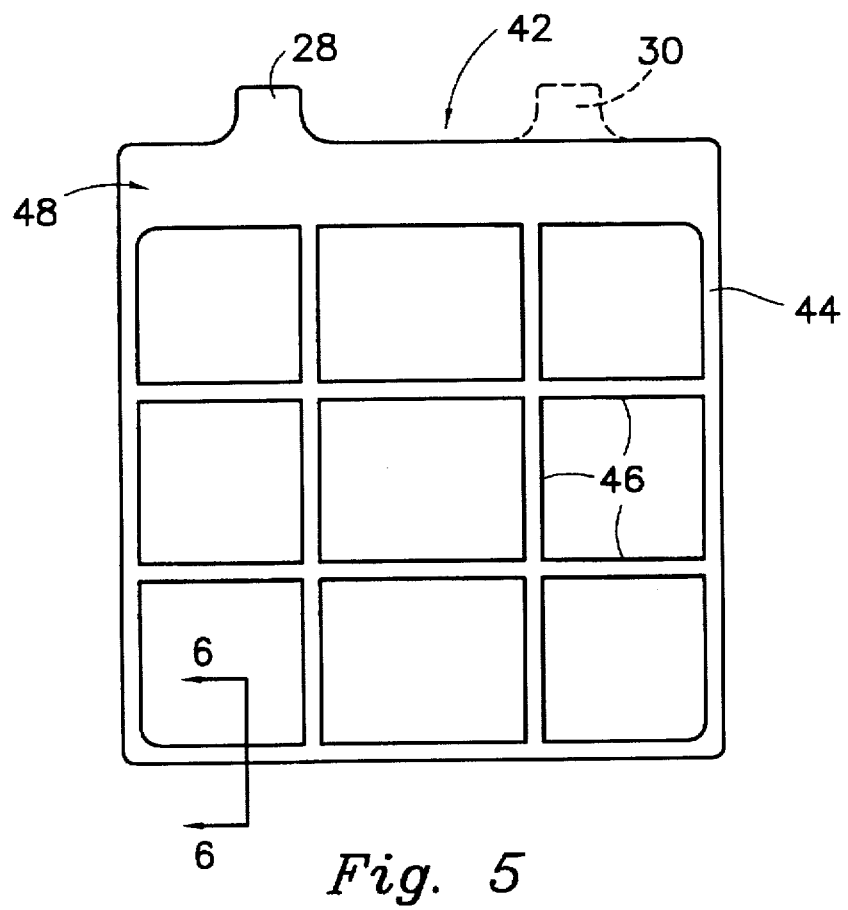
Fig. 5
Fig. 7
Fig. 6

5,718,987

LEAD-ACID BATTERY WITH INACTIVE CELL

FIELD OF THE INVENTION

This invention relates to lead-acid batteries in general and, specifically, to lead-acid batteries having dummy or inactive cells together with electrochemically active cells.

BACKGROUND OF THE INVENTION AND DESCRIPTION OF THE PRIOR ART

Lead-acid batteries with dummy or inactive cells together with electrochemically active lead-acid cells are known. Typically, such lead-acid batteries are fabricated with dummy or electrochemical inactive cells whenever it is desired to produce a lead-acid battery having a voltage output different from the six or twelve volt outputs which are readily available and, indeed, standard in the lead-acid battery industry.

One approach currently used to fabricate a lead-acid battery with a dummy cell is to modify a conventional battery by welding a shorting bar across adjacent connecting straps prior to seating the battery plate assemblies in the battery case. Subsequently, the cell in the battery which has been shorted by placement of the welding bar across the straps is skipped when filling the battery with acid. The welding must be performed by a skilled operator; it is difficult to achieve consistent weld quality which is necessary for repeatability of voltage output for lead-acid batteries with a given configuration of dummy cells.

SUMMARY OF THE INVENTION

In one of its aspects, this invention provides a lead-acid battery having a preferably compartmented case with a polarity of electrochemically active lead-acid cells within the case. These cells are preferably serially connected via respective positive and negative terminals. Each active cell includes preferably planar positive and negative plates.

Each electrochemically active lead-acid cell plate preferably includes a lead metal supporting grid and connecting means extending from the grid preferably in the form of a planar rectangular lug, which is co-planar with the plate, for parallel connection with other plates of like polarity within the cell. Connecting means of active cell plates of like polarity within the cell are preferably aligned. Connecting means of plates of differing polarities in adjoining cells preferably are also aligned. The active cell plates are preferably planar and transverse to the direction of alignment of these connecting means.

The battery further includes at least one electrochemically inactive cell preferably serially connected with the electrochemically active cells and preferably positioned intermediately thereof. The inactive cell preferably includes lead metal plates. Each of these inactive cell lead metal plates preferably may be defined by a lead metal grid of configuration different from the grids on which the positive and negative plates are fabricated. Preferably, the inactive cell planar lead metal plate or grid does not include the gridwork of members extending transversely one to another which forms a lattice for retaining applied paste when the active positive and negative plates are fabricated. In the preferred embodiment of the invention, the inactive cell planar lead metal plate or grid preferably includes an opened, unlatticed center and. Further includes a head portion extending between connecting lugs where the head portion is of substantially greater cross-sectional area in a direction transverse to a line of connection of the two lugs in the inactive cell and metal plate where grid is preferably planar. In a dummy cell of a lead-acid battery comprising a pair of planar rectangular solid connecting lugs extending from a periphery of said grid on a common side thereof at substantially equidistances from extremities of said side and substantially equidistanced from an axis of symmetry of said grid. Preferably, at least two connecting lugs extend from the inactive cell plate grids and preferably are in alignment with at least some of the connecting lugs of at least some of the positive and negative plates in the electrochemically active lead-acid cells.

Each inactive cell further preferably includes means for electrically parallel interconnecting the preferably lead metal plates of the inactive cell and for electrically serially connecting those preferably inactive cell lead metal plates with respective positive and negative plates in adjoining electrochemically active cells. The inactive cell plate connecting means preferably align with connecting means of plates of differing polarities in preferably adjoining electrochemically active cells, irrespective of the polarity of the plates and associated connecting means in those adjoining electrochemically active cells. The inactive cell further preferably includes insulating means separating the inactive cell plates from one another, holding the inactive cell plates in place and filling the inactive cell compartment. The insulating means may be rigid, may be homogeneous and may be plastic foam, preferably in sheet form.

Preferably, each cell of the battery occupies a case compartment which is preferably electrochemically isolated from remaining compartments.

In another of its aspects, this invention provides a lead-acid battery including electrochemically active positive and negative plates, with the positive and negative plates respectively preferably having aligned lug means for electromechanical interconnection of those plates. In this aspect of the invention, the battery preferably further includes a polarity of electrochemically inactive but yet electrically conductive plates, having connecting lugs aligned with connecting lugs of at least some of the positive and negative plates. In this aspect, the battery yet further preferably includes means for electrically serially connecting the electrochemically inactive plate connecting lugs with respective adjoining positive and negative plate connecting lugs with which the inactive plate lugs align. The inactive but yet electrically conductive plates preferably further include conductive head portions closely electrically connected with the connecting lugs and of substantially greater cross-section in the direction of current flow between the connecting lugs than the remaining structural portions of the grids on which the electrochemically active positive and negative plates are fabricated.

The connecting lugs are preferably rectangular with lug edges preferably parallel with the edges of the plates. Most preferably, all of the lugs, whether on the positive active plates, the negative active plates or the electrochemically inactive plates, are all rectangular and substantially identical.

3

Figure 1:
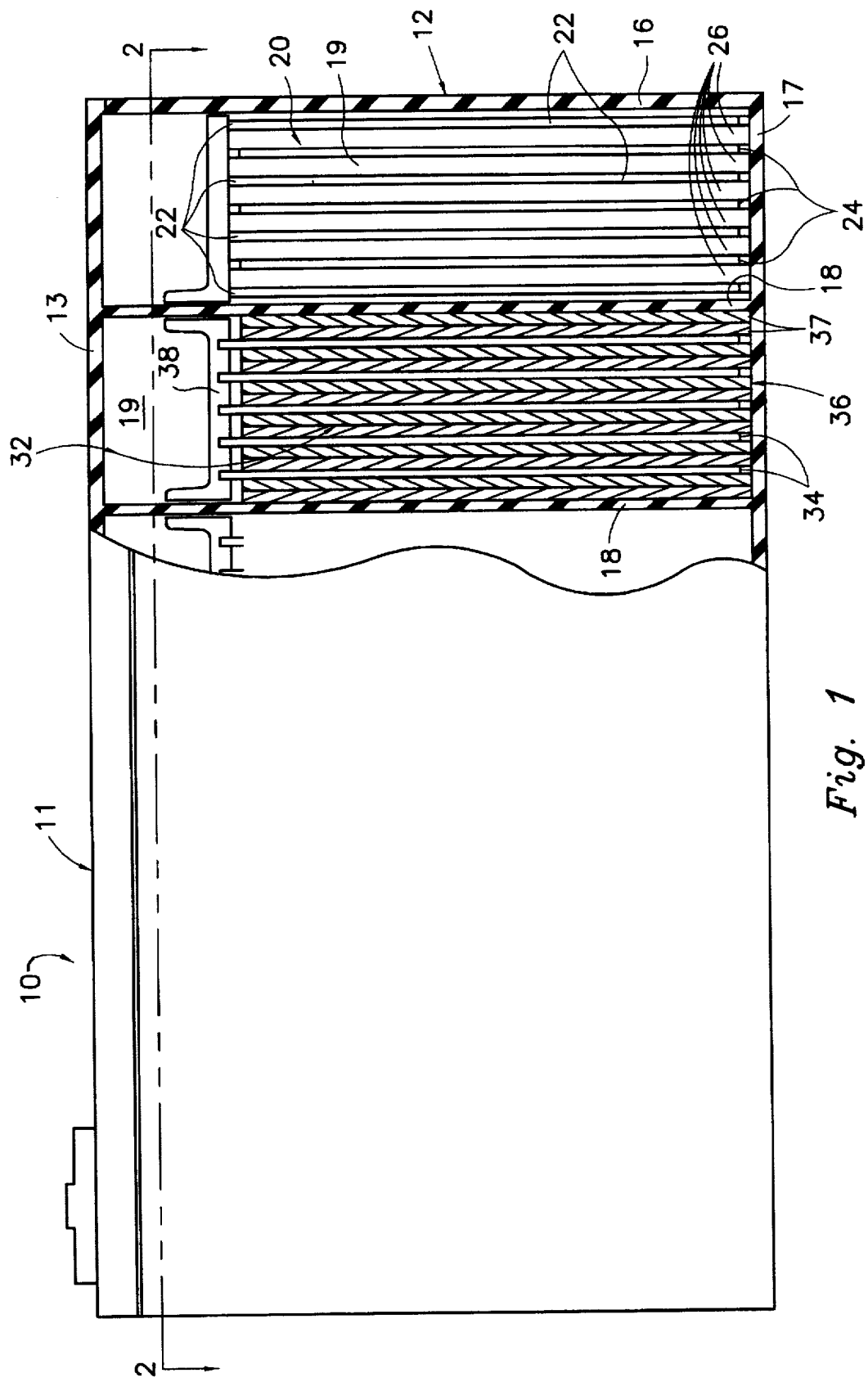
FIG. 1 is a partially broken side elevation of a lead-acid battery, having a electrochemically inactive or dummy cell, manifesting aspects of the invention.
Figure 2:
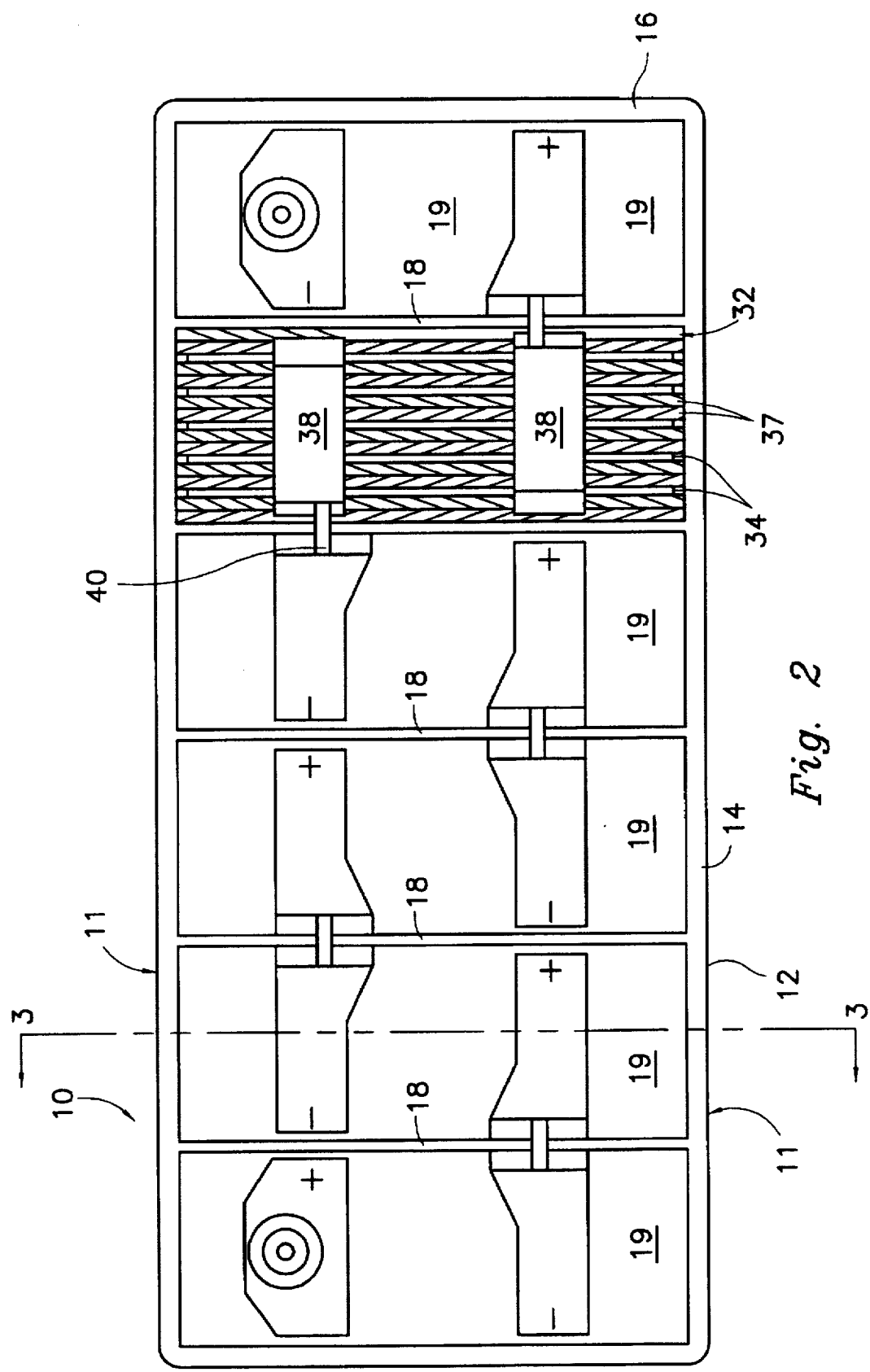
FIG. 2 is a top view of the lead-acid battery having an electrochemically inactive cell taken at lines and arrows 2—2 of FIG. 1 with certain internal parts of the battery not illustrated in order to aid drawing clarity and with certain section lines omitted also to aid drawing clarity.
Figure 3:
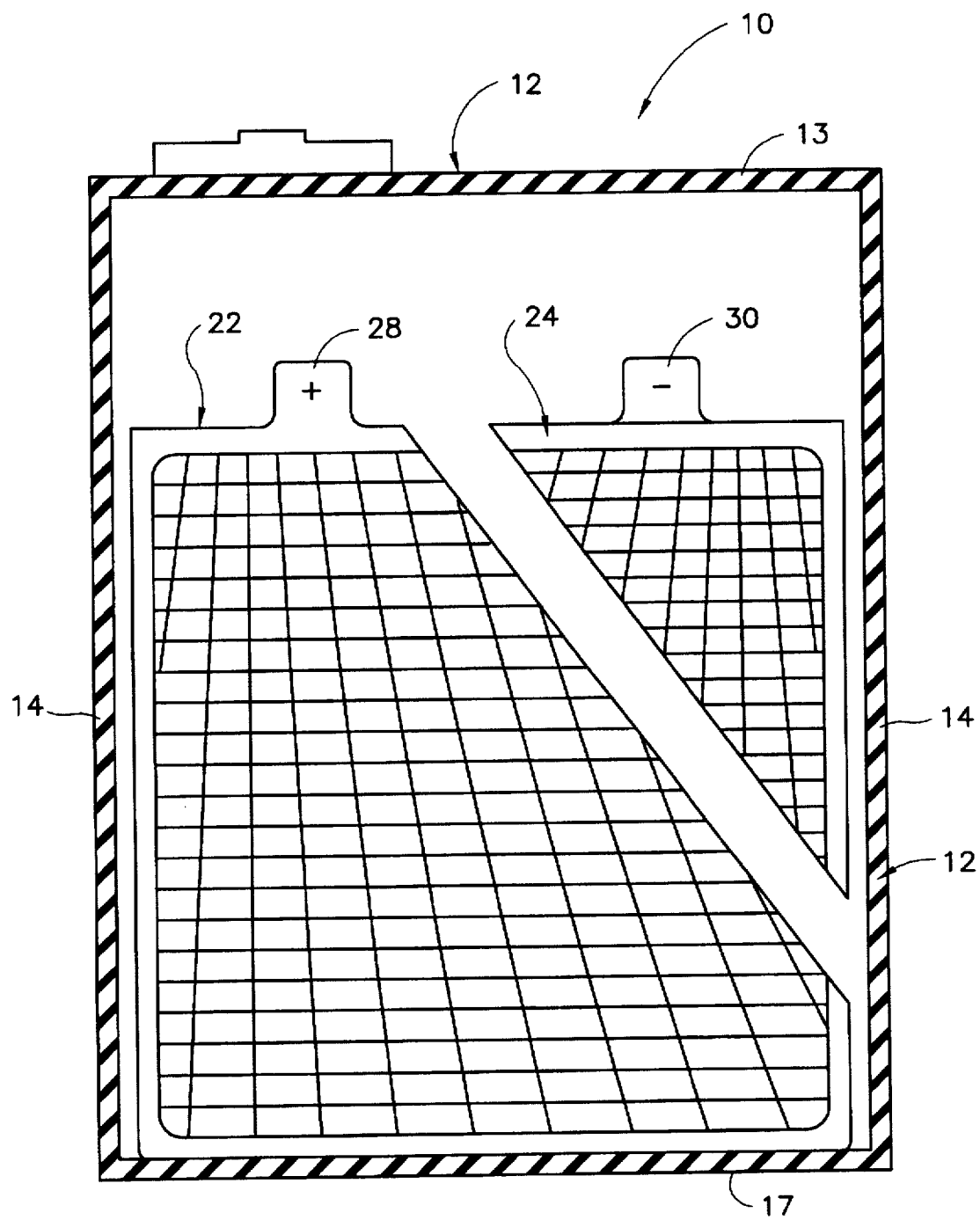

FIG. 3 is a schematic sectional view of the battery of FIGS. 1 and 2 which may be considered to be taken at lines and arrows 3—3 in FIGS. 1 and 2 with certain internal parts of the battery omitted to aid drawing clarity, illustrating portions of both positive and negative electrochemically active plates in schematic form.

Figure 4:
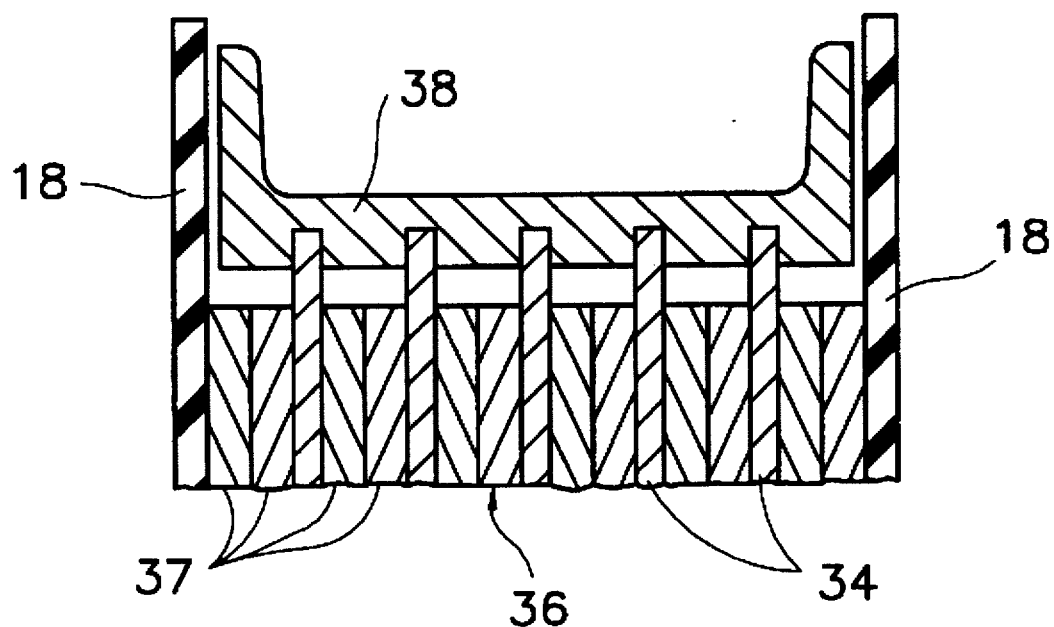

FIG. 4 is a partial sectional view of plates and plate connecting straps or shorting bars in a dummy cell portion of a lead-acid battery manifesting aspects of the invention, taken at lines and arrows 4—4 in FIG. 2.

FIG. 5 is a front elevation of an active plate grid suitable for use in fabricating active plates for use in the electrochemically active cells of a lead-acid battery manifesting aspects of the invention; after fabrication (by pasting the illustrated grid with suitable active material) plates of one polarity would be positioned with their connecting lugs at the position illustrated in solid lines and indicated by number 28 in FIG. 5 while plates of the opposite polarity would be positioned with their connecting lugs positioned as illustrated in dotted lines and indicated by numeral 30 in FIG. 5.

FIG. 6 is a broken sectional view taken at lines and arrows 6—6 in FIG. 5.

FIG. 7 is a bottom view of the active plate grid illustrated in FIG. 5.

Figure 8:
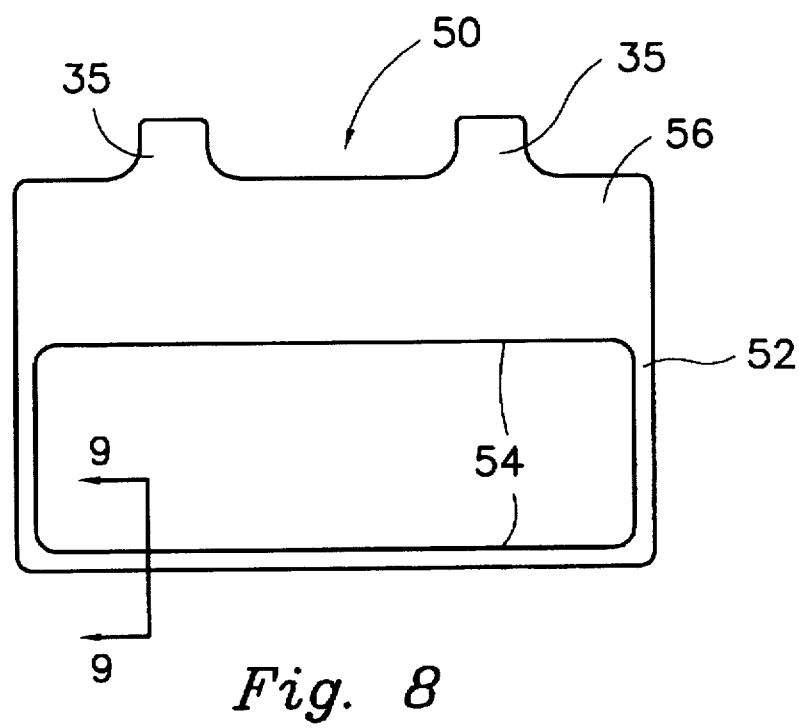

FIG. 8 is a front elevation of a plate or grid suitable for use in an inactive cell of a lead-acid battery manifesting aspects of the invention.

Figure 9:

FIG. 9 is a broken sectional view taken at lines and arrows 9—9 in FIG. 8.

Figure 10:

FIG. 10 is a bottom view of the inactive plate or grid illustrated in FIG. 8.

Numerical indicators appearing in the drawings correspond to numbers used in the following description of the preferred embodiments and the best mode known for practicing the invention.

DESCRIPTION OF THE PREFERRED EMBODIMENT AND BEST MODE KNOWN FOR PRACTICING THE INVENTION

Referring to the drawings in general and to FIGS. 1 and 2 in particular, a lead-acid battery manifesting aspects of the invention is designated generally 10 and includes a case designated generally 11, with case 11 having a jar or body portion 12 and a cover 13. Typically both jar 12 and cover 13 are thermoplastic. Cover 13 is conventionally solvent or heat welded to jar 12 to provide a liquid and preferably gas-tight case 11 for battery 10.

Jar 12 preferably includes-two longitudinal walls 14, a pair of transverse end walls 16 and a bottom 17.

Preferably molded in place within jar 12 are a plurality of partitions 18 which are preferably generally transverse to longitudinal walls 14 and parallel with transverse end walls 16. The molding is performed to mold partitions 18 in place when jar 12 is formed; this results in partitions 18 being integral with longitudinal walls 14 and bottom 17 of jar 12.

In the central portion of battery 10, partitions 18, together with bottom 17, and longitudinal walls 14 define a plurality of compartments 19. Similarly, at the extremities of battery 10, partitions 18 together with bottom 17 and transverse case ends 16, define a plurality of compartments 19. All of compartments 19 are preferably contiguous with, but are electrochemically insulated from, one another. Each compartment 19 provides space for either an electrochemically active cell or an electrochemically inactive cell (sometimes referred to as a "dummy" cell in the art).

4

Electrochemically active cells are designated generally 20. Each electrochemically active cell 20 preferably includes a plurality of positive lead metal plates 22 and a plurality of negative lead metal plates 24, with positive and negative plates 22, 24 being interleaved as illustrated generally in FIG. 1. Each active cell 20 preferably further includes a separator 26 between positive and negative plates 22, 24. Depending on the type of lead-acid battery, the separator material may be microporous glass mat or some other material.

Each electrochemically active cell further includes liquid electrolyte, preferably sulfuric acid, in sufficient amount to provide the required environment for electrochemical reaction between positive and negative plates 22, 24.

Each positive plate 22 in electrochemically active cell 20 includes a connecting lug 28, as illustrated in FIG. 3. Similarly, each negative plate 24 in an electrochemically active cell 20 preferably includes a connecting lug 30, also as illustrated in FIG. 3. Connecting lugs 28, 30 are integral parts of grids or internal frameworks on which positive and negative plates are fabricated by pasting the grids or frameworks with suitable lead-based active material. Respecting the schematically illustrated positive and negative plates 22 and 24 in FIG. 3, the cross-hatching in FIG. 3 which has been drawn to present a generally trapezoidal appearance schematically represents plates 22 and 24 and specifically active material which is visible at the surfaces of those plates. The trapezoidally shaped cross-hatching of plates 22, 24 is not intended to illustrate the configuration of the underlying grid or framework of these electrochemically active plates.

In a lead-acid battery manifesting aspects of the invention, at least one compartment 19 is not electrochemically active but rather is occupied by an electrochemically inactive or "dummy" cell 32, as depicted generally in FIGS. 1 and 2. Each dummy cell 32 preferably includes a plurality of plates 34 which are spaced one from another, as illustrated in FIGS. 1 and 2, preferably at substantially the spacing of respective adjacent interleved positive and negative plates 22, 24 in adjacent electrochemically active cells 20. Plate spacing illustrated in FIG. 1 is typical, there being substantially equal spacing between immediately adjacent plates 22, 24 in electrochemically active cell 20 and immediately adjacent plates 34 in dummy cell 32.

Dummy cell 32 preferably further includes insulating material between respective plates 34. The insulating material is designated 36 in FIGS. 1 and 2. Preferably the insulating material also provides plate support and most preferably is in the form of rigid foam plastic sheets designated 37 in FIG. 1. The insulating material preferably comprises precut sheets of such insulating rigid plastic foam to impart increased rigidity to the entire assembly to make the assembly more shock and damage resistant. The insulating plastic foam also minimizes heat transfer through the dummy cell plates.

Plates 34 in dummy cell 32 are electrically connected by a plate connecting strap or shorting bar 38. Electrical connection afforded by plate connecting strap 38 is preferably achieved by welding strap 38 to connecting lugs 35 at the tops of respective dummy cell plates 34, as shown in FIG. 4.

As illustrated in FIG. 2, each electrochemically inactive cell 32 preferably includes two plate connecting straps or shorting bars 38 welded across respective rows of aligned connecting lugs 35 of plates 34.

Most preferably electrochemically active cells 20 are positioned on either side of each electrochemically inactive or dummy cell 32 as illustrated in FIG. 2. Cell bridging or connecting straps 40 are preferably provided between and connecting respective plate connecting straps 38. Cell bridging straps 40 effectuate series electrical connection of the active and inactive cells in lead-acid batteries manifesting aspects of the invention.

Each active cell plate, whether positive or negative, is preferably fabricated from an active cell plate grid such as that designated generally 42 in FIG. 5. Preferably both positive and negative plates are fabricated from the same active cell plate grids. In other words, it is preferable as being economic, but not necessary, that only a single design of grid be employed and that both positive and negative active plates be fabricated by pasting such grids of such single design with appropriate positive or negative active material.

As illustrated in FIGS. 5 through 7, each grid 42 preferably includes a peripheral member 44, a plurality of interior cross members 46 running transversely to one another and a head portion 48 from which a connecting lug 28 extends. The positive and negative plates are preferably fabricated using a common grid. In FIG. 5 the preferred grid is illustrated in solid lines in a position in which the grid might be positioned after having been used to make a positive plate by having active material pasted thereon. Specifically, the connecting lug 28 shown in solid lines is at a left hand position illustrated in FIG. 5 resulting from the orientation of the grid and the positive plates once the grid is pasted with suitable active material.

Connecting lug 30 illustrated in dotted lines indicates the position, relative to that of a positive plate, of a negative plate after a grid 42 has been pasted with suitable active material to fabricate a negative plate. The orientation of the negative plate is such that the connecting lug is the position illustrated in dotted lines and indicated by numeral 30. Of course, positions of the connecting lugs for the positive and negative plates may be reversed merely by flipping or rotating the respective plates about a vertical axis.

Plate grids 42, on which the positive active cell plates and negative active cell plates are fabricated, preferably have the same size and configuration.

To assemble a desired arrangement of alternating positive and negative active cell plates for a given cell, respective positive and negative plates are transposed or flipped 180 degrees about a central, vertical axis of the grid, thereby orienting the connecting tab either on the upper right or upper left side of the plated fabricated on the grid, as per the grids illustrated in FIGS. 1, 3, and 5. Since both the positive and negative active cell plates are preferably fabricated on uniformly dimensioned plate grids fabricated to be symmetrical about the vertical axis (and hence symmetrical about a longitudinal axis of the battery after the plates have been assembled into cells and the cells in turn assembled into the battery) the resultant transverse or lateral spacing between respective connecting lugs of the active cell plates and the battery case is preferably constant for each cell and further is preferably constant throughout the battery.

Peripheral members 44 of an active cell plate grid 42 are preferably six-sided in configuration as illustrated in FIG. 6. Interior cross members similarly preferably have six sided cross sections. This generally hexagonal, although not right-hexagonal (as illustrated in FIG. 6, the sides of the hexagon are not of equal length) configuration of peripheral member 44 and interior cross members 46 facilitates adherence of the paste-like active material to the active call plate grid 42.

Head portion 48 of grid 42 is preferably of larger cross-section relative to the remainder of the peripheral portion of grid 42, as illustrated in FIG. 5. This provides required strength, after an active cell positive plate has been fabricated, when the plates are to be welded to connect with respective connecting plate straps 38 by way of rectangular connecting lugs 28 or 30.

The required plates for the dummy cell may be furnished in the form of grids 50 illustrated generally in FIG. 8. No paste is applied to grid 50; grid 50 defines a plate for use in the dummy cell. Preferably grid 50 is fabricated with dimensions substantially those of grid 42, at least with respect to the upper portion of grid 42 illustrated in FIG. 5, so that there is sufficient dimensional consistency between the grids that when the dummy cell is fabricated, the number of plates in the dummy cell is the same as that in active cells and the same manufacturing fixtures, assembly lines and assembly techniques may be used for the dummy cells as for the active cells going into a given size battery.

Each grid 50 preferably has a peripheral member 52 preferably of substantially the same size and cross-section as peripheral member 44. The size of grids 50 may vary depending on the dimensions of the battery in which grids 50 are incorporated.

Each dummy cell grid (and hence each resulting dummy cell plate) preferably has two connecting lugs 35 extending from head portion 56. Connecting lugs 35 are preferably positioned symmetrically about the longitudinal axis of the battery and symmetrically about a vertical axis of the dummy cell grid for longitudinal alignment with respective preferably rectangular connecting lugs 28, 30 of positive and negative plates 22, 24 of electrochemically active cells 20.

Thus, dummy cell plate grids 50 preferably have generally the same configuration and the same relative positioning as the active cell plate grids 42 so that the preferably rectangular connecting lugs of the active cell plates and dummy cell plates are longitudinally aligned and are transversely symmetrical with respect to a longitudinal and a vertical axis of the battery in which the cells are located. Each dummy cell plate grid 50, however, preferably has a pair of opposed connecting lugs fabricated in the same configuration as respective rectangular connecting lugs of a pair of adjacent, oppositely oriented, i.e. positive and negative, active cell plate grids 42.

Since the dummy cells plates or grids 50 are fabricated to be dimensioned uniformly with the plate grids on which both the positive and negative active cell plates are fabricated, spacing between the connecting lugs of the dummy cell plates and the battery case is substantially constant and is substantially the same as spacing between connecting lugs of active cell plates and the battery case. This is best illustrated by FIGS. 3, 5 and 8 of the drawings.

In FIG. 4 welded construction of a plate-shorting bar or straps with dummy cell plates 34 is illustrated. Welding shorting bar 38 to connecting lugs 35 of dummy cell plates 34 provides required electrical shorting of dummy cell plates 34 and provides sufficient strength to withstand the stresses created when cell bridging straps 40 illustrated in FIG. 2 are welded in place between adjacent electrochemically active cells 20 and a dummy cell 32.

The battery of this invention, incorporating a dummy cell to vary the voltage from that provided by standard batteries, can be produced using the same manufacturing process used to produce six or twelve volt batteries which are standard in the lead-acid battery industry. In particular, the double-lugged, lead-metal plates of the dummy cell of this invention can be interconnected in parallel using the cast-on process with which the lead metal plates of most conventional lead-acid electrochemical cells are interconnected when fabricating a battery cell. This enables the dummy cell to be manufactured and installed in the battery of the invention without the need for an additional processing step to short circuit the dummy cell prior to serially connecting the dummy cell in the battery case.

In conventional practice and as described above, each cell of a lead-acid battery comprises a collection of alternate parallel aligned negative and positive metal plates in a compartment containing an electrolyte solution. The lugs of the respective positive and negative plates are electromechanically interconnected by plate connecting straps. The most common method of interconnecting the plate lugs with connecting straps is by fabricating the connecting straps directly on the lugs using a casting process. This method is conventionally known as the cast-on method.

The cast-on process involves the initial step of alternately parallel aligning or stacking the positive and negative plates into an element to define a cell. Preferably lugs of the positive and negative parallel stacked plates defining the element to be used as a cell are preferably positioned in an upward orientation and are preferably aligned in two preferably parallel rows corresponding to the positive and negative plate connecting lugs. The positive and negative cell plates each preferably have one lug aligned with either a positive or negative row of lugs.

In this practice, after the active positive and negative plates are assembled to form the element to define the cell, the entire element is rotated 180 degrees so that the lugs are positioned in a downward orientation. The element is then lowered towards suitable molding cavities until the two rows of respective positive and negative connecting lugs are suspended in two separate molding cavities. The mold cavities are in the shape of the connecting straps.

In this practice, the mold cavities are filled with molten lead which completely surrounds the lugs, cools and solidifies to define a connecting strap. The element is then raised up, away from the mold cavities, with the straps having been cast in place. The resulting connecting straps electromechanically interconnect the lugs of the alternately stacked positive and negative plates respectively, thereby providing the element for one battery cell. Several battery cells are thereafter serially connected using cell bridging straps in a battery case to fabricate a battery providing a standard voltage once electrolyte is furnished and any required forming has been performed.

In the battery of this invention, the same element manufacturing process can be used to interconnect the parallel aligned plates of the dummy cell and simultaneously short circuit the dummy cell. Using the conventional cast-on process, the dummy cell element is arranged in essentially the manner described above except that the dummy cell does not have alternately aligned negative and positive plates. Rather, the dummy cell has a group of preferably parallel preferably aligned plates each having the same configuration, with no polarity being associated therewith.

In further contrast respecting the plates of an electrochemically active cell or a prior art dummy cell, each dummy cell plate in the battery of this invention preferably has at least two connecting lugs. Like an electrochemically active cell, connecting lugs of the dummy cell plates preferably form at least two preferably parallel preferably aligned rows at the top of the element. However, unlike an electrochemically active or prior art dummy cell, each dummy cell plate according to this invention preferably has a connecting lug residing in each of the two preferably parallel rows of connecting lugs. The two rows of connecting lugs on the dummy cell are preferably positioned and aligned in generally the same manner as the positive and negative rows of connecting lugs of the electrochemically active cells as described above.

The connecting straps are preferably fabricated on the connecting lugs of the dummy cell preferably using the casting process described above. Unlike prior art dummy cell configurations, the opposed connecting straps fabricated on the opposed rows of lugs need not be connected or bridged by an additional process or manufacturing step. Each connecting lug is preferably connected to an opposed connecting lug via a common dummy cell plate. Therefore, the connecting straps themselves are connected or bridged by the dummy cell plates which effectively short circuit the dummy cell. Thus, the invention eliminates the additional time consuming and costly separate manufacturing step of welding a short-circuiting bar in place.

While the preferred embodiments of the invention have been described, the scope of protection to which the invention is believed entitled is defined by the claims and by equivalents thereto which perform substantially the same function in substantially the same way to achieve substantially the same result as set forth in the claims, so long as such substantial equivalents, as defined by claims for such substantial equivalents, do not read on the prior art.

We claim the following:

1. A lead-acid battery comprising:
   a. a case;
   b. a plurality of lead-acid cells within said case, each comprising:
      i. a plurality of positive and negative lead metal plates;
      ii. said positive and negative plates having respective longitudinally aligned transversely offset means for connecting plates of like polarity;
   c. a dummy cell within said case, comprising:
      i. a plurality of lead metal plates spaced one from another;
      ii. means, longitudinally aligned with at least one of said positive and negative plate connecting means, and being spaced from said plates intermediate positions of connection therewith for electrically connecting said dummy cell plates one with another; and
   d. means for serially electrically interconnecting said cells.

2. The battery of claim 1 wherein said positive and negative plate connecting means are transversely offset from one another.

3. The battery of claim 1 wherein said means for electrically connecting said dummy cell plates one with another is means for electrically parallel connecting said dummy cell plates with one another.

4. The battery of claim 1 wherein said electrical connecting means further comprises means for electrically serially connecting said dummy cell with at least one of said lead-acid cells.

5. The battery of claim 1 wherein said dummy cell is intermediate said lead-acid cells.

6. The battery of claim 1 wherein said positive and negative plate connecting means include respective lugs extending from said plates in a first transverse direction, respective positive and negative plate lugs being offset from one another in a second transverse direction.

7. The battery of claim 3 wherein said dummy cell plates comprise lugs extending therefrom in said first transverse direction, offset from one another in said second transverse direction and aligned with said lugs of said positive and negative plates.

8. The battery of claim 4 wherein said dummy cell is intermediate said lead-acid cells.

9. A lead-acid battery comprising:
   a. electrochemically active positive plates;
   b. electrochemically active negative plates;
   c. said positive and negative active plates respectively having lug means transversely symmetrical respecting a battery longitudinal axis for respective electromechanical series interconnection thereof;
   d. a plurality of electrochemically inactive electrically conductive plates having transversely symmetrical connecting means respectively aligning with respective connecting means of said positive and negative plates;
   e. means for electrically serially connecting said electrochemically inactive plate connecting means with respective adjoining positive and negative plate connecting means with which said inactive plate connecting means are aligned and being spaced from said conductive plates intermediate points of connection with said connection means thereof.

10. The battery of claim 6 wherein said lugs are generally rectangular.

11. The battery of claim 7 wherein lug edges are parallel with edges of said plates.

12. A lead-acid battery comprising:
   a. a plurality of serially connected electrochemically active cells, each comprising:
      i. a plurality of interleaved positive and negative plates and electrolyte contacting said plates for electrochemical interaction therebetween;
      ii. said positive and negative cells respectively comprising longitudinally aligned connecting lugs;
   b. an electrochemically inactive cell intermediate said electrochemically active cells and serially connected therebetween, comprising lead metal plates having connecting lugs longitudinally aligned with said connecting lugs of said positive and negative plates said inactive cell plate connection lugs being electrically connected by conductive means spaced from said inactive cell plates intermediate said inactive plate connecting lugs;
   c. said inactive and active cells being serially electrically connected via said connecting lugs.

13. The battery of claim 8 further comprising:
   a. a plurality of plates in(said inactive cell each having connecting lugs aligned with connecting lugs of said positive and negative plates.

14. The battery of claim 10 further comprising insulating means supporting said inactive cell plates.

15. The battery of claim 11 wherein said insulating means is rigid.

16. The battery of claim 11 wherein said insulating means is homogeneous.

17. The battery of claim 11 wherein said insulating means is foam.

18. A lead-acid battery comprising:
   a. a plurality of electrochemically active lead-acid cells serially connected via respective positive and negative terminals, each cell including positive and negative plates;
      i. each plate including means for parallel connecting with other plates of like polarity within said cell;
      ii. connecting means of plates of like polarity being aligned;
      iii. connecting means of plates of differing polarities in adjoining cells being aligned;
   b. an electrochemically inactive cell serially connected with said electrochemically active cells intermediately thereof, comprising:
      i. lead metal plates; and
      ii. means for parallel connecting said lead metal plates and serially connecting with respective positive and negative plates in adjoining electrochemically cells;
      iii. said inactive cell plate connecting means being spaced therefrom intermediate said inactive cell plates and aligning with connecting means of plates of differing polarities in adjoining electrochemical cells irrespective of polarity.

19. The battery of claim 15 wherein said inactive cell lead metal plates include connecting lugs aligned with connecting lugs of said positive and negative plates.

20. The battery of claim 15 further comprising insulating means separating said inactive cell plates from one another.

21. The battery of claim 17 wherein said insulating means is rigid.

22. The battery of claim 17 wherein said insulating means is homogeneous.

23. The battery of claim 17 wherein said insulating means is foam.

24. The battery of claim 15 further comprising a compartmented case and wherein:
   a. each cell occupies a case compartment; and
   b. each compartment is electrochemically isolated from remaining compartments.

25. The battery of claim 21 further comprising foam filling said compartment housing said inactive cell.

26. The battery of claim 16 wherein said plates are planar with rectangular peripheries.

27. The battery of claim 19 wherein said connecting means include planar rectangular lugs extending from and co-planar with said plates.

28. The battery of claim 24 wherein said plates are transverse to direction of alignment of said connecting means.

29. The battery of claim 24 wherein said connecting lugs of said electrochemical cell plates and said inactive cell plates are identical.

30. The battery of claim 24 wherein said plates comprise lead metal grids and said connecting lugs extend from said grids.

31. A lead-acid battery comprising:
   a. a compartmented case;
   b. a plurality of electrochemically active lead-acid cells serially connected via respective positive and negative terminals, each cell including planar positive and negative plates;
      i. each active cell plate including a lead metal grid and connecting means extending from said grid in the form of a planar solid rectangular lug co-planar with said plate for parallel connection with other plates of like polarity within said cell;
      ii. connecting means of active cell plates of like polarity in a cell being aligned;
      iii. connecting means of plates of differing polarities in adjoining cells being aligned;
      iv. said active cell plates being transverse to direction of alignment of said connecting means;
   c. an electrochemically inactive cell serially connected with said electrochemically active cells intermediately thereof, comprising:

i. planar lead metal plates including lead metal grids and planar rectangular solid connecting lugs extending from said grids in longitudinal alignment with said planar rectangular solid connecting lugs of said positive and negative plates;
ii. means for electrically parallel interconnecting said lead metal plates and for electrically serially connecting them with respective positive and negative plates in adjoining electrochemically active cells;
iii. said inactive cell plate connecting means longitudinally aligning with said planar rectangular solid connecting means of plates of differing polarities in adjoining electrochemically active cells irrespective of polarity and being vertically spaced from said inactive cell plates at positions;
iv. rigid homogeneous foam insulating means separating said inactive cell plates from one another and filling said inactive cell compartment;

wherein each cell occupies a case compartment electrochemically isolated from remaining compartments.

32. A lead metal grid for use in a dummy cell of a lead-acid battery comprising a pair of connecting lugs extending from a periphery of said grid on a common side thereof substantially equidistanced from extremities of said side and substantially equidistanced from an axis of symmetry of said grid.

33. The lead metal grid of claim 32 further comprising a head portion extending between said connecting lugs of substantially greater cross-sectional area transverse to direction of current flow between said lugs than the remainder of said grid thereby to provide a path between said lugs of low electrical resistance relative to the remainder of said grid.

34. The grid of claim 32 wherein said connecting lugs are generally planar.

35. The grid of claim 33 wherein said connecting lugs are generally rectangular.

36. The grid of claim 34 wherein said connecting lugs are solid.

* * * * *